US012187076B2

(12) United States Patent
Härtwig et al.

(10) Patent No.: US 12,187,076 B2
(45) Date of Patent: Jan. 7, 2025

(54) PNEUMATIC TIRE FOR A VEHICLE

(71) Applicant: Continental Reifen Deutschland GmbH, Hannover (DE)

(72) Inventors: Andreas Härtwig, Hannover (DE); Andreas Schwenke, Isernhagen (DE); Florian Kristen, Burgwedel (DE); Nico Meier, Hannover (DE); Alexander Wüst, Seelze (DE); Cord-Christian Neuber, Wunstorf (DE)

(73) Assignee: Continental Reifen Deutschland GmbH, Hannover (DE)

( * ) Notice: Subject to any disclaimer, the term of this patent is extended or adjusted under 35 U.S.C. 154(b) by 198 days.

(21) Appl. No.: 17/756,055

(22) PCT Filed: Oct. 13, 2020

(86) PCT No.: PCT/EP2020/078743
§ 371 (c)(1),
(2) Date: May 16, 2022

(87) PCT Pub. No.: WO2021/099032
PCT Pub. Date: May 27, 2021

(65) Prior Publication Data
US 2022/0402306 A1 Dec. 22, 2022

(30) Foreign Application Priority Data
Nov. 19, 2019 (DE) ...................... 10 2019 217 819.7

(51) Int. Cl.
*B60C 11/12* (2006.01)
*B60C 11/03* (2006.01)
(52) U.S. Cl.
CPC ...... *B60C 11/0302* (2013.01); *B60C 11/1218* (2013.01); *B60C 11/1281* (2013.01); *B60C 2011/1213* (2013.01)

(58) Field of Classification Search
CPC ............ B60C 11/0302; B60C 11/1218; B60C 2011/1213
See application file for complete search history.

(56) References Cited

U.S. PATENT DOCUMENTS

| 2002/0139164 A1* | 10/2002 | Ishihara | B29D 30/0606 425/46 |
| 2006/0118221 A1* | 6/2006 | Tsubono | B60C 11/12 152/DIG. 3 |

(Continued)

FOREIGN PATENT DOCUMENTS

| CN | 101462470 A | 6/2009 |
| CN | 107995896 A | 5/2018 |

(Continued)

OTHER PUBLICATIONS

English machine translation of JPH04-173407 (Year: 1992).*

(Continued)

*Primary Examiner* — Robert C Dye

(57) ABSTRACT

A pneumatic vehicle tire, in particular utility vehicle tire, having a tread which has a directional profiling with shoulder-side and middle profile ribs running in a circumferential direction, wherein at least one of the middle profile ribs (1), which is in particular a profile rib running along the tire equator, is traversed in an axial direction by sipes (4) with a width ($b_1$) of 0.5 mm to 1.2 mm, each of which has a central portion (4a), in which the sipe (4) runs with an undulation in the direction of extent thereof, and two lateral portions (4b). The sipes (4) extend, in plan view, in an arc shape and symmetrically with respect to the centerline of the profile rib (1), and, in the lateral portions (4b) and in the central portion (4a), have a uniform undulation running in the radial direction, on which the undulation present in the (Continued)

Figure 3:
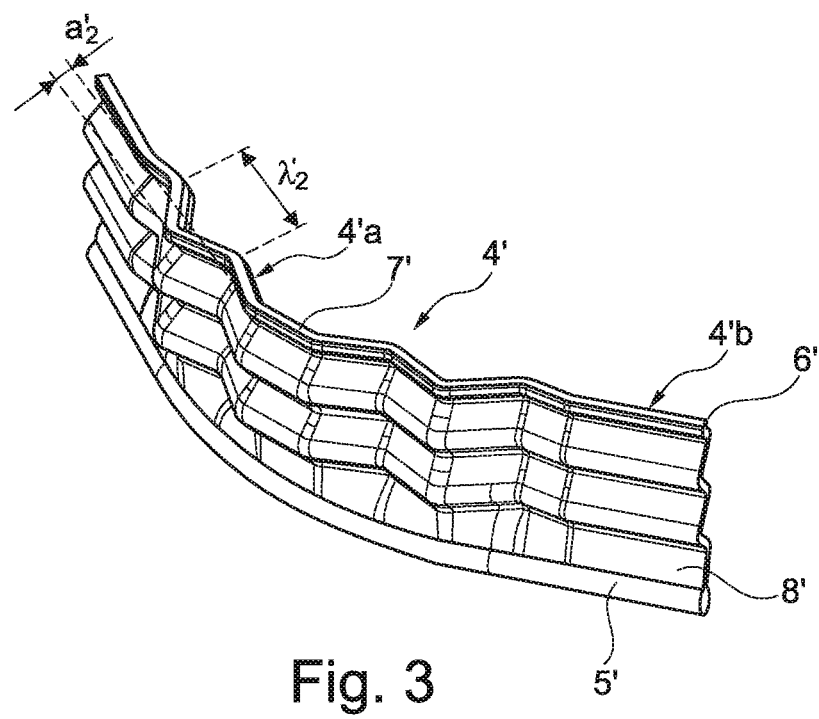

extent direction of the sipes (4) is superposed only in the central portion (4a) of the sipe (4).

17 Claims, 2 Drawing Sheets

(56) References Cited

U.S. PATENT DOCUMENTS

| | | |
|---|---|---|
| 2009/0159167 A1 | 6/2009 | Scheuren |
| 2013/0032261 A1* | 2/2013 | Kouda .................... B60C 11/11 152/209.18 |
| 2015/0053320 A1 | 2/2015 | Mathonet et al. |
| 2015/0258860 A1* | 9/2015 | Sabetti ................ B60C 11/1218 264/299 |
| 2018/0244111 A1 | 8/2018 | Zhu et al. |
| 2019/0381837 A1* | 12/2019 | Dixon ..................... B60C 11/04 |

FOREIGN PATENT DOCUMENTS

| | | | |
|---|---|---|---|
| JP | 04173407 A * | 6/1992 | ............. B60C 11/12 |
| JP | H04306106 A | 10/1992 | |
| JP | 04372406 A * | 12/1992 | ............. B60C 11/12 |
| JP | 2004210043 A * | 7/2004 | ......... B60C 11/0306 |
| WO | 9421478 A1 | 9/1994 | |
| WO | 2017040007 A1 | 3/2017 | |
| WO | 2017176280 A1 | 10/2017 | |
| WO | 2017177132 A1 | 10/2017 | |

OTHER PUBLICATIONS

English machine translation of JPH04-372406 (Year: 1992).*
English machine translation of JP2004210043 (Year: 2004).*
Chinese Office Action dated Mar. 29, 2023 for the counterpart Chinese Patent Application No. 202080079984.0.
International Search Report dated Nov. 27, 2020 of International Application PCT/EP2020/078743 on which this application is based.

* cited by examiner

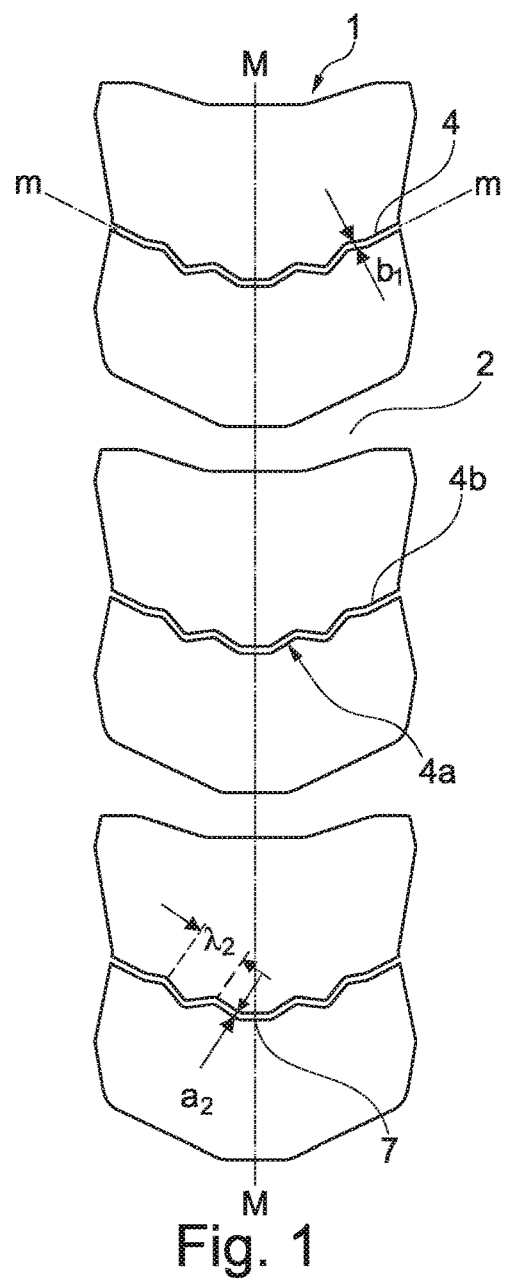
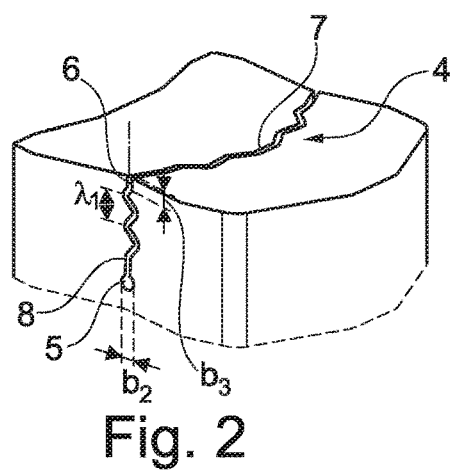
Fig. 1
Fig. 2

PNEUMATIC TIRE FOR A VEHICLE

The invention relates to a pneumatic vehicle tire, in particular a utility vehicle tire, having a tread which has a directional profiling with shoulder-side and middle profile ribs running in a circumferential direction, wherein at least one of the middle profile ribs, which is in particular a profile rib running along the tire equator, is traversed in an axial direction by sipes with a width of 0.5 mm to 1.2 mm, each of which has a central portion, in which the sipe runs with an undulation in the direction of extent thereof, and two lateral portions, Utility vehicle tires with profiled treads designed in this way are known in various embodiments. For example, WO 2017/177132 A1 has disclosed a utility vehicle tire with a tread which has six profile ribs running in encircling fashion in a circumferential direction, two substantially unstructured shoulder-side profile ribs, and four middle profile ribs running in the middle region between the shoulder-side profile ribs. In the four central profile ribs, sipes are formed with relatively large spacings to one another such that they extend, overall, in a V shape across all of the profile ribs, wherein the vertices of the V shape are situated in the region of a circumferential channel at the central circumferential mid-line of the tread. This known utility vehicle tire therefore has a directional profile. The sipes each have central portions which run with an undulation in the extent direction of the sipes.

The sipes in the profile ribs of the treads of utility vehicle tires are intended to assist in achieving good grip characteristics, good water drainage on wet surfaces, and good wet braking characteristics. The conventionally provided sipes, which extend in a straight manner and run with an undulation, influence the profile stiffness in the circumferential and transverse directions that is required for low wear such that they cause uneven wear, which is known as "heel and toe wear". The mobility of the profile ribs also contributes to the noise emissions of the tire. A further problem of such sipes is the risk of the ingress of stones, which can lead to damage to or tears in the rubber material, in particular at the sipe base.

The invention is therefore based on the object of designing a utility vehicle tire of the type mentioned in the introduction such that, whilst the original function of the sipes in the tread is maintained, reduced, more uniform wear and lower noise emissions are achieved, and the sensitivity of the sipes with regard to the trapping of stones is considerably reduced.

The stated object is achieved according to the invention in that the sipes extend, in plan view, in an arc shape and symmetrically with respect to the mid-line of the profile rib, and, in the lateral portions and in the central portion, have a uniform undulation running in a radial direction, which is overlapped only in the central portion of the sipes by the undulation that is present in the extent direction of the sipes.

Each sipe thus has an undulation in the radial direction over its entire extent, which undulation primarily prevents stones from ingressing as far as the groove base. In the central portion, the undulation present in the radial direction overlaps the undulations present in the axial direction, giving rise to surface elements on the sipe walls which ensure stabilizing mutual support of the sipe walls under load, such that the circumferential and transverse stiffness of the profile rib in which such sipes are formed is increased, such that low and uniform tread wear is supported and noise emissions are reduced.

The abovementioned supporting action is particularly advantageous and pronounced if the central portion of the sipe covers 50% to 80% of the extent length of the sipe.

In order to particularly effectively prevent an ingress of stones as far as the channel base, it is furthermore advantageous if the undulation present in the radial direction runs over at least 70% of the radial extent of the sipe.

For uniform stabilization of the profile rib, it is furthermore advantageous if the undulation present in the radial direction is sinusoidal or similar to a sinusoidal shape, and if the undulation in the extent direction of the sipe is zigzag-shaped, wherein these undulations are preferably uniform undulations.

For particularly effective mutual support of the sipe walls, it is furthermore advantageous if the undulation present in the radial direction has a smaller wavelength, in particular a wavelength that is smaller by at least 30% and by up to 60%, than that of the undulation present in the extent direction of the sipe.

It is furthermore preferable here if the undulation present in the radial direction has a wavelength which is 20% to 50% of the greatest depth of the sipe in the radial direction and if the undulation present in the extent direction of the sipe has a wavelength of 8.0 mm to 11.0 mm.

An embodiment is particularly preferable in which the undulation present in the radial direction and the undulation present in the extent direction of the sipe each have an amplitude of 0.8 mm to 1.2 mm, in particular approximately 1.0 mm.

Uniform tread wear is supported in particular in that the undulation present in the extent direction of the sipe is composed of two zigzag-shaped regions which, in the middle of the sipe, are connected to one another by means of a connecting portion which extends in a straight line in an axial direction as seen in plan view.

Also particularly advantageous is an embodiment in which the sipe has a sipe base which is rounded, in particular rounded in a circular arc shape, in cross section and which, as seen in a plan view of the sipe, extends along or in accordance with the arc shape of the sipe and which, in cross section, has a greatest width or a greatest diameter which is greater than the width of the rest of the sipe. Here, the greatest width or the greatest diameter of the sipe base in cross section is 1.0 mm to 4.0 mm. A sipe base designed in this way effectively counteracts the risk of tears occurring in this otherwise delicate region.

Further measures that are advantageous for uniform wear consist in that the sipe has, proceeding from the tread periphery, an edge section which runs in the radial direction and which has a width of 1.5 mm to 2.5 mm in the radial direction, and that the sipe has a transition portion to the sipe base, in which transition portion the undulations disappear.

Figure 4:
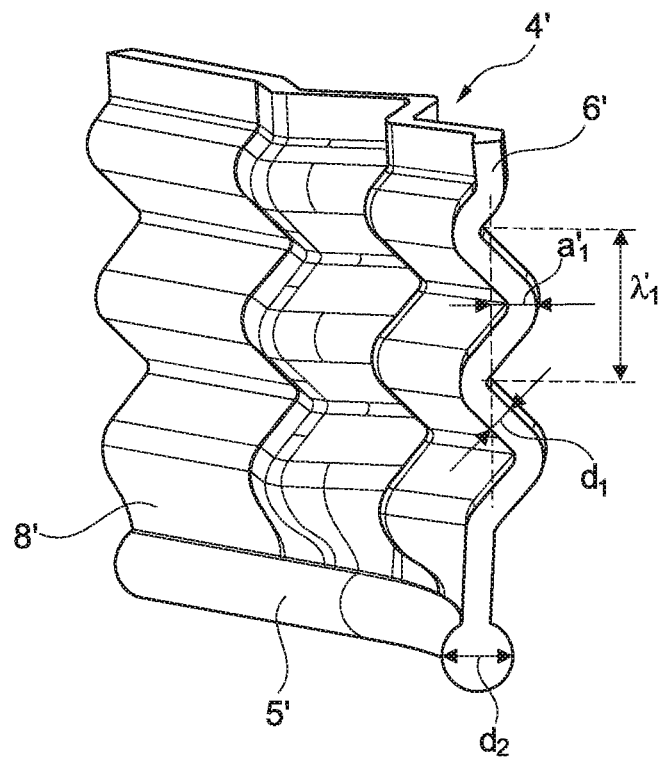

Further features, advantages and details of the invention will now be described in more detail with reference to the drawing, which schematically illustrates an exemplary embodiment of the invention. In the drawings:

FIG. 1 shows a circumferential portion of a profile rib of a tread of a utility vehicle tire, FIG. 2 is an oblique view of a profile block from FIG. 1, FIG. 3 shows an oblique view of a mold element for forming a sipe in the profile block according to FIG. 2, and FIG. 4 shows a detail of the mold element from FIG. 3 in an enlarged illustration.

FIG. 1 shows a circumferential portion of a middle profile rib 1 of a tread, which has a directional profiling, of a vehicle tire, in particular of a utility vehicle tire, which is preferably a truck tire or a bus tire of radial type of construction. The profile rib 1 in the example runs in encircling fashion around the tread along the tire equator, has its mid-line M-M along the tire equator, and is divided into profile blocks 3 by transverse channels 2. The tread has further profile ribs (not illustrated) to the side of the profile rib 1, wherein a total of three to seven profile ribs are provided, which are separated from one another by circumferential channels running in the circumferential direction. Alternatively, the tread has one circumferential channel along the tire equator and two central profile ribs to the side of the circumferential channel.

In each case one sipe 4 is formed in the middle region in each profile block 3 of the middle profile rib 1. The transverse channels 2 and the sipes 4 run substantially parallel to one another, and furthermore in an arc shape and symmetrically with respect to the mid-line M-M. Further channels that form the profiling, for example likewise transverse channels, in other provided profile ribs run such that, overall, a tread of directional design is provided, such that a pneumatic vehicle tire having such a tread must be installed on the vehicle such that, during forward travel, the transverse channels 2 and the sipes 4 enter the ground contact patch with their center of curvature first.

The central profile rib 1 may also be configured in some other way while maintaining the directionality, for example with transverse channels that are interrupted in the middle. The profile rib 1 may furthermore also be designed so as to have only sipes 4 and no transverse channels, and is therefore a profile rib of substantially closed design.

As will be described in detail below, each sipe 4 has a sipe base 5 which is rounded in cross section and which, in the axial extent of the sipe 4, runs approximately in an arc shape, which is in particular approximately a circular arc with a radius of 28.0 mm to 35.0 mm. Each sipe 4 has two lateral portions 4b, which are of identical design in a radial direction, and a central portion 4a situated between these. Viewed along the correspondingly and substantially arc-shaped central line m of the sipe 4, the central portion 4a extends over 50% to 80% of the length of the line m, and each lateral portion 4b therefore extends over 10% to 25%.

The special configuration of the sipe 4 in the central portion 4a and in the lateral sections 4b will be discussed in more detail below with reference to a mold element 4' illustrated in FIG. 3, the enlarged detail of the mold element 4' illustrated in FIG. 4, and with reference to FIG. 2. Only that part of the mold element 4' which forms the sipe 4 during the vulcanization of the pneumatic vehicle tire in a tire vulcanization mold is shown. As is generally known, mold elements are anchored by means of anchoring sections (not illustrated), for example are integrally cast, in those mold parts of the tire vulcanization mold which form the profiling of the tread during vulcanization. Correspondingly to the configuration of the sipe 4, the mold element 4' has a central portion 4'a and lateral portions 4'b and also an edge element 5' which forms the sipe base 5 and which runs substantially in an arc shape and which has a rounded, in particular circular, cross section. The edge element 5' has a diameter $d_2$ of 1.0 mm to 4.0 mm, in particular 1.5 mm to 3.5 mm, preferably 2.0 mm, and is at least 0.2 mm greater than the in particular constant thickness $d_1$ of 0.5 mm to 1.2 mm of the mold element 4' in its remaining region. That edge of the mold element 4' which is situated opposite the edge element 5' has an edge portion 6' which runs in the radial direction and which in this direction has a width $b_3'$ of 1.5 mm to 2.5 mm.

The sipe 4 thus has a sipe width $b_1$, corresponding to the thickness $d_1$ of the mold element 4', of likewise 0.5 mm to 1.2 mm, in particular 0.8 mm. The sipe base 5 of the sipe 4, which is rounded in cross section, runs similarly to the central line m and has a width $b_2$ corresponding to the diameter $d_2$ of the edge element 5'. At the tread periphery, the sipe 4 begins with an edge section 6 corresponding to the edge section 6' of the mold element 4'.

The mold element 4' has, over at least 70% of the radial extent thereof, an undulation running in the radial direction. The two edge portions 4'b of the mold element 4' are structured exclusively with this undulation. This undulation, which is in particular uniform, sinusoidal or similar to a sinusoidal shape, extends over at least 1.5 wavelengths A', in particular two wavelengths A', wherein one wavelength A' corresponds to 20% to 50% of the greatest height of the mold element 4' in the radial direction and is for example 4.0 mm to 4.5 mm, in particular 4.25 mm. The undulation has an amplitude $a_1'$ of 0.8 mm to 1.2 mm, in particular of 1.0 mm.

The sipe 4 thus runs, in the radial direction over at least 70% of its radial extent, with an undulation corresponding to the undulation of the mold element 4' and with a wavelength $\lambda_1$ of 20% to 50% of its greatest depth in the radial direction and with an amplitude $a_1$ of 0.8 mm to 1.2 mm.

In the central portion 4'a of the mold element 4', the undulation present in the radial direction is overlapped by a zigzag undulation running in the direction of extent of the mold element 4', that is to say in the axial direction. A zigzag undulation differs from the already described undulation which is sinusoidal or similar to a sinusoidal shape in that its portions run in substantially straight fashion, and the undulation troughs and peaks are more sharply pointed. In the exemplary embodiment shown, a region which runs in a zigzag undulating shape and which is composed of at least one and a half wavelengths $\lambda_2'$ is provided so as to begin in each case at one of the lateral sections 4'b, wherein, between the two regions running in a zigzag undulating shape, a connecting portion 7' running in the axial direction is situated exactly in the middle of the mold element 4'. The length 1' of the connecting portion 7' is 4.5 mm to 5.0 mm, and the wavelength $\lambda_2'$ is 8.0 mm to 11.0 mm. The amplitude $a_2'$ of the zigzag undulation is 0.8 mm to 1.2 mm, in particular 1.0 mm. A transition portion 8' to the edge element 5' is formed, in which both of the undulations disappear in a continuous manner.

In the central portion 4a of the sipe 4, correspondingly to the configuration of the mold element 4', the above-described undulation present in the radial direction is therefore overlapped by a zigzag undulation in the axial direction, corresponding to the zigzag undulation of the mold element 4'. The amplitude $a_2$ and the wavelength $\lambda_2$ correspond in magnitude to the wavelength $\lambda_2'$ and the amplitude $a_2'$. In the middle of the sipe, there is situated a connecting portion 7 (FIG. 1) which runs in the axial direction and in a straight manner in plan view. Also, in the sipe 4, the zigzag undulation disappears in a transition portion 8 to the rounded sipe base 5.

The sipes 4 are therefore provided with sipe walls which have surface elements which give rise to particularly advantageous mutual support under different loads; in particular, the stiffness of the profile rib or of the profile blocks of the rib is increased by way of such sipes. This is associated with reduced, and at the same time more uniform, wear of the tread. Above all, the mutual support of the sipe walls prevents the sipes from opening unfavorably widely in the circumferential direction, whereby the circumferential stiffness is increased. Since the mobility of the profile rib is restricted, the noise emissions otherwise associated with greater mobility are significantly suppressed. In the interior of the sipe close to the sipe base, the structures disappear, such that, with progressive wear of the tread, the already relatively high stiffness is compensated for. The rounded sipe base further reduces the risk of tears forming in this delicate region with respect thereto. Above all, the undulation present in the radial direction furthermore prevents an ingress of stones into the sipe.

LIST OF REFERENCE SIGNS

1 . . . Profile rib
2 . . . Transverse channel
3 . . . Profile block
4 . . . Sipe
4' . . . Mold element
4a, 4'a . . . Central section
4b, 4'b . . . Lateral section
5' . . . Edge element
5 . . . Sipe base
6, 6' . . . Edge portion
7, 7' . . . Connecting portion
8, 8' . . . Transition portion
$a_1, a_1'$ . . . Amplitude
$a_2, a_2'$ . . . Amplitude
$\lambda_1, \lambda_1'$ . . . Wavelength
$\lambda_2, \lambda_2'$ . . . Wavelength
$b_1, b_2, b_3$ . . . Width
$d_1$ . . . Thickness
$d_2$ . . . Diameter
m . . . Central line
M-M . . . Mid-line

The invention claimed is:

1. A pneumatic vehicle tire having a tread which has a directional profiling with shoulder-side and middle profile ribs running in a circumferential direction, wherein at least one of the middle profile ribs (1), which is a profile rib running along a tire equator, is traversed in an axial direction by sipes (4) with a width ($b_1$) of 0.5 mm to 1.2 mm, each of which has a central portion (4a), in which the sipes (4) run with an undulation in an extent direction thereof, and two lateral portions (4b);
   wherein the sipes (4) extend, in plan view, in an arc shape and symmetrically with respect to a mid-line of the profile rib (1), and, in the lateral portions (4b) and in the central portion (4a), have a uniform undulation running in a radial direction, which is overlapped only in the central portion (4a) of the sipes (4) by the undulation that is present in the extent direction of the sipes (4),
   wherein the undulation present in the extent direction of the sipes (4) is composed of two zigzag-shaped regions which, in the middle of the sipe, are connected to one another by means of a connecting portion (7) which extends in a straight line in the axial direction as seen in plan view,
   wherein the sipes (4) each have a transition portion (8) to a rounded sipe base (5), in which transition portion the undulations disappear.

2. The pneumatic vehicle tire as claimed in claim 1, wherein the central portion (4a) of a sipe covers 50% to 80% of the extent length of the sipe.

3. The pneumatic vehicle tire as claimed in claim 1, wherein the undulation running in the radial direction runs over at least 70% of the radial extent of the sipes (4).

4. The pneumatic vehicle tire as claimed in claim 1, wherein the undulation present in the radial direction is a sinusoidal shape.

5. The pneumatic vehicle tire as claimed in claim 1, wherein the undulation present in the extent direction of the sipes (4) is zigzag-shaped.

6. The pneumatic vehicle tire as claimed in claim 1, wherein the undulation present in the radial direction has a wavelength ($\lambda_1$) that is smaller, by at least from 30% to up to 60%, than that of the undulation present in the extent direction of the sipes (4).

7. The pneumatic vehicle tire as claimed in claim 1, wherein the undulation present in the radial direction has a wavelength ($\lambda_1$) that is from 20% to 50% of the greatest depth of the sipes (4) as measured in the radial direction.

8. The pneumatic vehicle tire as claimed in claim 1, wherein the undulation present in the extent direction of the sipes (4) has a wavelength ($\lambda_2$) of from 8.0 mm to 11.0 mm.

9. The pneumatic vehicle tire as claimed in claim 1, wherein the undulation present in the radial direction and the undulation present in the extent direction of the sipes (4) each have an amplitude ($a_1$, $a_2$) of from 0.8 mm to 1.2 mm.

10. The pneumatic vehicle tire as claimed in claim 1, wherein the undulation present in the radial direction and the undulation present in the extent direction of the sipes (4) each have an amplitude ($a_1$, $a_2$) of approximately 1.0 mm.

11. The pneumatic vehicle tire as claimed in claim 1, wherein the undulation present in the radial direction and the undulation present in the extent direction of the sipes (4) are uniform undulations.

12. The pneumatic vehicle tire as claimed in claim 1, wherein the sipes (4) each has a sipe base (5) which is a circular arc shape, in cross section view, and which, as seen in a plan view of the sipes (4), extends along or in accordance with the arc shape of the sipes (4) and which, in cross section view, has a greatest width ($b_2$) which is greater than the width ($b_1$) of the rest of each of the sipes (4).

13. The pneumatic vehicle tire as claimed in claim 12, wherein the greatest width ($b_2$) of the sipe base (5), in cross section view, is from 1.0 mm to 4.0 mm.

14. The pneumatic vehicle tire as claimed in claim 1, wherein the sipes (4) each has a sipe base (5) which is a circular arc shape, in cross section view, and which, as seen in a plan view of the sipes (4), extends along or in accordance with the arc shape of the sipes (4) and which, in cross section view, has a greatest diameter which is greater than the width ($b_1$) of the rest of each of the sipes (4).

15. The pneumatic vehicle tire as claimed in claim 14, wherein the greatest diameter of the sipe base (5), in cross section view, is from 1.0 mm to 4.0 mm.

16. The pneumatic vehicle tire as claimed in claim 1, wherein the each of the sipes (4) has, proceeding from a tread periphery, an edge section (6) which runs in the radial direction and which has a width ($b_3$) in the radial direction of from 1.5 mm to 2.5 mm.

17. The pneumatic vehicle tire as claimed in claim 1, wherein the middle of the sipe extending in the straight line in the axial direction is the only segment of the sipe extending in this direction, the remaining segments of the sipe extending in a direction that is inclined relative to the axial direction.

* * * * *